United States Patent Office 3,812,036
Patented May 21, 1974

3,812,036
PREPARATION OF SYNTHETIC HYDROCARBON LUBRICATION
Hugh E. Romine, Ponca City, Okla., assignor to Continental Oil Company, Ponca City, Okla.
No Drawing. Filed Oct. 2, 1972, Ser. No. 293,965
Int. Cl. C10m 1/16, 1/18
U.S. Cl. 252—59
20 Claims

ABSTRACT OF THE DISCLOSURE

A process for preparing a synthetic hydrocarbon lubricant, said lubricant comprising a mixture of long-chain, substantially linear, alkyl-substituted aryl compounds, containing a total of 12 to 42 carbon atoms in the long-chain alkyl group or groups, and linear mono-olefin oligomers, said process comprising: (a) contacting an admixture of $C_6$–$C_{16}$ linear mono-olefins and mononuclear aromatic compounds with a mild Friedel-Crafts catalyst under reaction-promoting conditions of time and temperature and (b) recovering from the reaction product of step (a) the desired product. If desired, the mixture of step (a) can contain a minor amount of mononuclear aromatic compounds containing a $C_6$–$C_{16}$ straight-chain alkyl group. The product has excellent low temperature viscosity and pour point properties, as well as an excellent viscosity index. The product is especially suitable as a lubricant for low temperature (i.e. below —40° F.) conditions.

BACKGROUND

Field of the invention

This invention is directed to a process for preparing a synthetic hydrocarbon which is suitable for use as a lubricant under extremely low temperature (i.e. below —40° F. and particularly below —60° F.) conditions.

General background

It is known that certain dialkylbenzenes (e.g. those having $C_{10}$–$C_{15}$ straight-chain alkyl groups) have physical properties which render them useful as low temperature lubricants. For example, U.S. Pat No. 3,173,965 contains such teachings.

The use of linear mono-olefin oligomers as lubricants is also well known. In general, the prior art teaches the preparation of these materials from α-olefin using transition-metals or complexes of aluminum alkyls and transition-metals as the catalyst. While the linear olefin oligomers have outstanding physical properties (e.g. viscosity index and pour point) they are deficient in oxidation stability and compatibility with various conventional lubrication oil additives.

Copendng application Ser. No. 280,059, filed Aug. 9, 1972, of which I am the inventor, is directed to synthetic hydrocarbon lubricant compositions comprising mixtures of di-n-long-chain alkaryls (or synthetic hydrocarbon compositions containing a major amount of di-n-long-chain alkaryls) and linear mono-olefin oligomers. These compositions have certain unexpectedly improved properties over either materials above.

More specifically, the mixtures of dialkaryls and linear mono-olefin oligomers provide the following improvements:

(a) The —40° F. viscosity, as compared to the interpolated viscosity, is lower than that of either material alone;

(b) The mixture is more compatible to additive combinations than the linear olefin oligomers alone;

(c) Compositions comprising the mixture and various additive combinations have improved viscosity indexes as compared to either the dialkaryls or linear olefin oligomers containing the additive package.

The present invention is directed to a process of preparing compositions comprising mixtures of long-chain, substantially linear, alkyl-substituted aryl compounds, containing a total of 12 to 42 carbon atoms in the long-chain alkyl group or groups, and linear mono-olefin oligomers.

Prior art

As a result of a search by a Washington searcher, the following references are believed to be the most pertinent.

U.S. Pat. No. 2,518,529 teaches the preparation of synthetic lubricants by the simultaneous alkylation and polymerization of benzene and a cracked distillate using aluminum chloride as the catalyst. While the patent contains no specific statements, it strongly implies the teachings of complete polymerization followed by alkylation of benzene with the polymer. Although the patent does not provide complete data on the product, the data given shows the product thereof to be significantly inferior to that of my process, e.g. the product of Example 1 has a solidifying point (i.e. pour point) of —30° C. (=—22° F.).

U.S. Pat. No. 3,104,267 teaches the preparation of long-chain alkyl aromatic hydrocarbons. According to the process of this patent, a $C_2$–$C_{10}$ α-olefin is polymerized in the presence of benzene using as a catalyst a combination of a titanium halide and an alkyl aluminum halide in the absence of any moisture. The admixture is then contacted with HCl or HBr in a dry state which causes alkylation of benzene with the olefin polymer. Data in the example shows that (1) the first reaction is entirely polymerization and (2) in the second reaction all of the polymer reacts with the benzene.

U.S. Pat. No. 3,382,291 teaches the preparation of olefin polymers, suitable for use as lubricants, by the polymerization of a $C_5$–$C_{20}$ 1-olefin using $BF_3$ and a complex of $BF_3$ and a promoter, such as water, alcohol or acetic acid.

U.S. Pat. No. 3,149,178 teaches the preparation of olefin polymers, suitable for use as lubricants, by the polymerization of α-olefin using Friedel-Crafts catalysts, including $BF_3$ and $AlCl_3$.

In addition to the patents discussed in the foregoing, prior art searches produced the following U.S. patents and references: 2,443,083; 2,810,769; 2,856,445; 2,882,-289; 2,886,609; 3,070,636; 3,189,660; 3,288,716; 3,410,-925; 3,437,707; 3,576,898; 3,398,206; 3,448,050; 3,538,-178.

It should be noted that this discussion of prior art does not contain any references produced by a computer search for the following reasons: the computer search produced no references more pertinent than those described herein and the search resulted in many totally irrelevant patents.

In summary, the prior art does not teach applicants' invention as described herein. More particularly, the prior art does not teach a process using carefully controlled conditions whereby complete polymerization followed by complete alkylation of the aromatic hydrocarbon does not cccur.

BRIEF SUMMARY OF THE INVENTION

Broadly stated, the present invention is directed to a process for preparing a synthetic hydrocarbon lubricant, said lubricant comprising a mixture of long-chain, substantially linear, alkyl-substituted aryl compounds, containing a total of 12 to 42 carbon atoms in the long-chain alkyl group or groups, and linear mono-olefin oligomers, said process comprising:

(a) Forming an admixture of $C_6$–$C_{16}$ linear mono-olefin, a mononuclear aromatic compound and a mild Friedel-Crafts catalyst, (b) Under reaction-promoting conditions of time and temperature, reacting the admixture of step (a) until from about 15 to about 90 weight percent of the linear mono-olefin have been converted to products of higher molecular weight, and (c) Recovering from the reaction product of step (b) the desired admixture of long-chain, substantially linear, alkyl-substituted aryl compounds and linear mono-olefin oligomers.

In one aspect the admixture of step (a) can contain additionally a minor amount of mononuclear aromatic compound containing a $C_6$–$C_{16}$ straight-chain alkyl group or a minor amount of a synthetic hydrocarbon composition containing a major amount of mononuclear aromatic compounds containing a $C_6$–$C_{16}$ straight-chain alkyl group.

In a preferred aspect the process of my invention is conducted so that the product of step (c) has the following physical properties:

Viscosity, cs.
210° F.: 5.0 minimum
—40° F.: 8,000 maximum
Pour point, ° F.: at least —70

DETAILED DESCRIPTION

Materials used

Suitable linear mono-olefins for use in my process are α-olefins which contain from 6 to 16 carbon atoms, more suitably from about 8 to about 12 carbon atoms, and preferably about 10 carbon atoms. Either pure materials, or mixtures of materials containing the designated number of carbon atoms can be used. The preferred materials can be a mixture of α-olefins containing about 8 to about 12 carbon atoms, with the average number of carbon atoms being about 10.

Suitable mononuclear aromatic compounds contain 6 to 10 carbon atoms and are represented by the formula

wherein A and $A_1$ are hydrogen or alkyl groups containing from 1 to 4 carbon atoms, with the total number of carbon atoms being no more than 4. Examples of suitable mononuclear aromatic compounds include benzene, toluene, xylene, ethylbenzene, propylbenzene, butylbenzene, methylpropylbenzene and diethylbenzene. Benzene is the preferred mononuclear aromatic compound.

As indicated hereinbefore, if desired, the initial admixture can contain a minor amount of mononuclear aromatic compounds containing a $C_6$–$C_{16}$ straight-chain alkyl group. Such compounds are represented by the formula

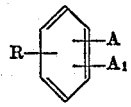

wherein A and $A_1$ are as defined in the foregoing and R is a $C_6$–$C_{16}$ straight-chain alkyl group.

Also, as indicated hereinbefore, if desired the initial admixture can contain a minor amount of a synthetic hydrocarbon composition containing a major amount (i.e. 60 to 92 weight percent) of the $C_6$–$C_{16}$ alkaryls. These synthetic hydrocarbon compositions contain a minor amount of other hydrocarbons, such as diphenylalkanes and alkyl-substituted tetrahydronaphthalenes, having molecular weights corresponding to the n-long-chain alkaryls.

A particularly suitable synthetic hydrocarbon composition has the following composition:

| Component: | Percent by weight |
|---|---|
| $C_6$–$C_{16}$ alkaryls | 60–92 |
| Alkyl-substituted tetrahydronaphthalenes | 5–30 |
| Miscellaneous alkyl aromatics, less than | 15 |
| Preferably less than | 10 |

The di-n-$C_6$–$C_{16}$ alkaryls meet the description provided in the foregoing.

The alkyl-substituted tetrahydronaphthalenes can be represented by the formula

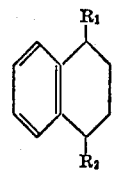

wherein $R_1$ and $R_2$ contain from 1 to about 13 carbon atoms each, with the sum of $R_1$ and $R_2$ being from about 2 to about 14. The alkyl groups, $R_1$ and $R_2$ are straight-chain.

The alkyl-substituted tetrahydronaphthalenes have the same boiling range as the n-alkylbenzenes. In addition, they have approximately the same molecular weight.

When using only linear mono-olefins and the mononuclear aromatic compounds the amounts are as follows, expressed as ratio of α-olefin to aromatic compound.

| | Moles |
|---|---|
| Suitable | 0.1:1–2:1 |
| Preferred | 0.2:1–0.5:1 |

When the reaction admixture contains mononuclear aromatic compounds containing a $C_6$–$C_{16}$ straight-chain alkyl group, in addition to the linear mono-olefins and mononuclear aromatic compounds, these materials can be substituted for up to 25 mole percent of the mononuclear aromatic compounds. Preferably, the substitution of these materials is no more than 10 mole percent of the mononuclear aromatic compounds. The minimum amount of these materials when used is 1 mole percent based on mononuclear aromatic compounds.

The more suitable catalysts for the process of my invention are nitromethane modified aluminum chloride and aluminum bromide with nitromethane modified aluminum chloride being preferred. Other suitable catalysts include weak Friedel-Crafts catalysts, such as HF, $BF_3$ etherate, $ZnCl_2$, and $FeCl_3$.

The nitromethane modified aluminum chloride or bromide suitably contains from about 1 to about 25 moles, preferably from about 2 to about 15 moles of nitromethane per mole of aluminum chloride or bromide.

The amount of aluminum chloride or aluminum bromide suitably is from about 0.1 to about 10 weight percent, preferably from about 1 to about 5 weight percent, based on the α-olefin.

Usually, it is desirable to use an effective amount of a promoter, such as water, HCl, HBr, or alkyl chloride or bromide in the reaction. The use of such promoters in alkylation reactions is well known. Since the use of these materials is well known, any person skilled in this art, without undue experimentation, can readily determine the optimum amount.

Process conditions

The relative amounts of the various materials has been described hereinbefore.

The reaction is conducted at a temperature suitably in the range of about 30 to about 80° C. at atmospheric pressure. More suitably, the reaction temperature is from about 50 to about 70° C. at atmospheric pressure. Preferably, the reaction temperature is from about 50 to about 60° C. at atmospheric pressure.

The reaction time is dependent on a number of factors such as amount of reactants, amount of catalyst, amount of promoter, temperature, and desired degree of olefin conversion (which will be discussed in detail later). In general, the reaction time is in the range of ¼ to 12 hours. Knowing all of the features of the process as described herein any person skilled in this art can readily determine the required reaction time.

In conducting the reaction an admixture is formed of the reactants in a suitable reaction vessel. The reaction is continued until the desired degree of olefin conversion is obtained, whereupon it is terminated, usually by the use of ice, water, a cooling temperature, or a combination of these means.

The reaction product is then subjected to a distillation which takes overhead water, unreacted mononuclear aromatic compound, $C_6$–$C_{16}$ alkyl substituted mononuclear aromatic compound and olefin dimer. The desired product is the bottoms fraction. The cut-point is dependent on the linear mono-olefin employed since it is desirable to take overhead substantially all of the olefin dimer. In general the cut-point is in the range of 700–900° F., preferably 790–860° F. Knowing the olefin employed anyone skilled in the art can select a cut-point such that the bottom product does not contain more than 10 percent (wt.), preferably no more than 5 percent (wt.) olefin dimer.

As indicated previously, a salient feature of my process is the degree of olefin conversion to higher molecular weight products such as olefin oligomers and long-chain alkaryls. Products containing optimum amounts of these materials have superior physical properties. In the process the following reactions occurs: conversion of the olefin to oligomers and alkylation of the aryl compound by a portion of the oligomer formed. In addition, alkylation of the aryl compound by a portion of the original olefin can also occur.

An olefin conversion of less than 15% give a low yield of heavy materials which is composed of 90% or more of oligomers. The product is relatively viscous with a high viscosity index and a high pour point. Olefin conversions of above 90% produces a product which is not as suitable in that it has higher viscosities and a lower viscosity index.

An olefin conversion in the range of about 40 to about 90 percent is preferred since it produces the best products. Olefin conversion in this range produces product containing 20 to 50 weight percent long-chain, substantially linear, alkyl-substituted aryl compounds with substantially all of the remainder being olefin oligomers.

Knowing that a certain degree of olefin conversion is desired, from the information provided herein any person skilled in this art can easily arrive at the required conditions (i.e. amount of catalyst, promoter, temperature and reaction time) to provide the desired olefin conversion. Alternatively, in order to obtain the desired degree of olefin conversion the reaction can be monitored and the degree of conversion measured by a correlation of viscosity or by chromatographic means.

PRODUCT OF MY INVENTION

The process of my invention preferably produces a product having the following composition:

| | Percent by weight |
|---|---|
| Long-chain alkyl-substituted aromatics | 20–50 |
| Olefin oligomers | 50–80 |
| Olefin dimers: Maximum | 10 |

The long-chain alkyl-substituted aromatics are represented by the formula

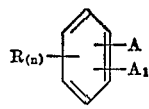

wherein A and $A_1$ are hydrogen or alkyl groups containing 1 to 4 carbon atoms, with the total number of carbon atoms being no more than 4; R is a long-chain alkyl group containing 6 to 32 carbon atoms; and $n$ is an integer of 1 or 2; and wherein the total number of carbon atoms in the long-chain alkyl group or groups is from 12 to 42, preferably from 16 to 36.

The long-chain alkyl groups are substantially linear since these alkyl groups are predominantly derived from olefin monomer or lower olefin oligomers.

When olefin monomer is the alkylating species, the alkyl group is linear and is attached to the aromatic ring by a secondary carbon atom of the alkyl group. When lower olefin oligomers are the alkylating species, the alkyl group is slightly branched and attachment to the ring is through a secondary or tertiary alkyl carbon.

The linear olefin oligomers contain at least 50 weight percent, more usually at least 60 weight percent, of materials containing 24 to 60 carbon atoms.

The product of my invention has outstanding physical properties, such as pour point, viscosity properties, and viscosity index. For example, the product has the following properties:

| | Suitable | More suitable | Preferred |
|---|---|---|---|
| Pour point, ° F., at least | −70 | −75 | −78 |
| Viscosity index, at least | 120 | 128 | 130 |
| Viscosity, cs.: | | | |
| −40° F., max | 8,000 | 7,500 | 7,200 |
| 100° F | 28.5–30.0 | 29–30 | 29.0–29.5 |
| 210° F., min | 5.0 | 5.2 | 5.4 |

In order to disclose the nature of the present invention still more clearly, the following examples, both illustrative and comparative, will be given. It is to be understood that the invention is not to be limited to the specific conditions or details set forth in these examples except insofar as such limitations are specified in the suggested claims.

EXAMPLE 1

This example illustrates the effect of varying degrees of olefin conversions, and in so doing illustrates the suitable and preferred conditions.

To a 12-liter flask equipped with a stirrer and a thermometer there were added 5,328 grams (67.8 moles) of benzene, 1,932 grams (13.8 moles) of decene-1 and 30.0 grams (0.15 moles) of dodecyl chloride (promoter). The flask was immersed in a water bath and the contents brought to 50° C. whereupon there was added a solution of 720 grams (0.54 mole) of aluminum chloride in 360 grams (5.9 moles) of nitromethane. The reaction was conducted at 44 to 53° C. (average near 50° C.) for a period of 10 hours. Samples for chromatographic analysis (5 ml. each) were withdrawn and quenched with water at regular intervals. Large samples were also withdrawn and quenched with water during the course of the reaction. The amounts of sample and time of withdrawal are shown below:

| | Amount, g. | Reaction time (hours) |
|---|---|---|
| Sample number: | | |
| A | 1,920 | 3.5 |
| B | 1,920 | 5.0 |
| C | 1,280 | 6.5 |
| D | 1,280 | 8.5 |
| E | Remainder | 10.0 |

Each sample was washed with water, 5 percent sodium carbonate solution, and again with water and then dried over sodium sulfate.

The samples were then subjected to a distillation to recover decene-1, decylbenzenes and the desired bottoms. The results are summarized below:

|  | Grams | | |
|---|---|---|---|
|  | Decene | Decylbenzene | Bottoms* |
| Sample: | | | |
| A | 379.8 | 60.0 | 48.4 |
| B | 334.5 | 111.2 | 77.3 |
| C | 130.7 | 97.8 | 56.2 |
| D | 85.1 | 124.2 | 70.6 |
| E | 44.0 | 174.8 | 92.1 |

*Using a cut-point of 803° F. at atmospheric pressure.

The degree of olefin conversion, average molecular weight, mass spectrometer analyses, and physical properties of these samples are shown in Table I below:

From the physical properties shown above it is apparent that Sample C, with a 47 percent olefin conversion, was the best, with Samples B, D, and E being the next best.

EXAMPLE 2

Using substantially the same procedure as in Example 1, a series of runs were made. The aromatic compound was benzene while the α-olefin was decene-1 or dodecene-1. In some cases a promoter was not used. Where a promoter was used, the nature is specified in the summary below. The cut-point for separating bottoms was 803° F. for decene-1 and 846° F. for dodecene-1, respectively. The nature of the materials and reaction conditions are shown in Table II below. The percent olefin conversion, mass spectrometer analyses, and physical properties for these runs are summarized in Table III below:

TABLE II

| | | | | | Reaction conditions | | | | |
|---|---|---|---|---|---|---|---|---|---|
| | | | | | | Mole ratio | | Olefin conversion, percent | Bottoms (as percent of olefin charge) |
| | Olefin | Promoter | T, °C. | Time hr. | Olefin/Bz[1] | AlCl$_3$/olefin | AlCl$_3$/Nm[2] | | |
| Run number: | | | | | | | | | |
| G | C$_{10}$ | 1.1% RCl | 60 | 1.8 | 0.20 | 0.039 | 0.090 | 57 | 22.4 |
| H | C$_{10}$ | 10 drops H$_2$O at 4.7 hrs | 50 | 6.0 | 0.20 | 0.078 | 0.090 | 91 | 38.1 |
| I | C$_{10}$ | None | 50 | 5.0 | 0.20 | 0.039 | 0.180 | 47 | 23.8 |
| J | C$_{10}$ | 1.1% RCl | 60 | 1.0 | 1.15 | 0.039 | 0.090 | 69 | 46.5 |
| K | C$_{10}$ | 1.1% RCl | 60 | 1.8 | 0.20 | 0.039 | 0.090 | 71 | 28.0 |
| L | C$_{10}$ | 2.2% RCl | 60 | 1.7 | 0.20 | 0.039 | 0.090 | 71 | 30.5 |
| M | C$_{10}$ | 1.1% RCl | 60 | 4.2 | 0.20 | 0.039 | 0.045 | 70 | 28.5 |
| N | C$_{10}$ | 1.1% RCl | 59 | 4.0 | 0.20 | 0.039 | 0.090 | 86 | 41.1 |
| O | C$_{12}$ | None | 50 | 4.5 | 0.20 | 0.039 | 0.090 | 70 | 16.2 |

[1] Bz=Benzene. [2] Nm=Nitromethane.

TABLE III

| | Olefin conversion, percent | Average molecular weight | Mass spectrometer analysis, percent | | | Viscosity, cs. | | | Visc. index | Pour point, °F. |
|---|---|---|---|---|---|---|---|---|---|---|
| | | | Alkylbenzene | Oligomer | Dimer | 210° F. | 100° F. | −40° F. | | |
| Run No.: | | | | | | | | | | |
| G | 57 | 509 | 23 | 77 | 0 | 5.49 | 30.32 | 6,984 | 130 | −80+ |
| H | 91 | 434 | 44 | 56 | 10 | 4.43 | 22.53 | 4,656 | 118 | −75+ |
| I | 47 | 515 | 22 | 78 | 14 | 5.97 | 33.80 | 9,189 | 134 | −75 |
| J | 69 | 419 | 46 | 54 | 1 | 4.05 | 19.91 | 3,401 | 112 | −80+ |
| K | 71 | 466 | 36 | 64 | 0 | 5.24 | 27.68 | 6,511 | 134 | −70 |
| L | 71 | 464 | 40 | 60 | 0 | 5.12 | 27.44 | 6,236 | 128 | −75 |
| M[1] | 70 | 442 | 33 | 67 | 0 | 4.19 | 22.55 | 4,330 | 96 | −80+ |
| N | 86 | 463 | 49 | 51 | 0 | 5.14 | 27.72 | 6,750 | 127 | −70 |
| O | 70 | | 60 | 41 | 1 | 5.42 | 29.64 | 7,949 | 131 | −65 |

[1] This run shows the effect of using a high nitromethane ratio.

TABLE I

| | Sample number | | | | |
|---|---|---|---|---|---|
| | A | B | C | D | E |
| Olefin conversion, percent | 16 | 30 | 47 | 67 | 83 |
| Mass spectrometer analyses: | | | | | |
| Av. mol. wt | 505 | 495 | 493 | 490 | 474 |
| Percent alkyl benzene | 8 | 14 | 20 | 29 | 41 |
| Percent oligomer | 92 | 86 | 80 | 71 | 60 |
| Percent dimer | 3 | 0 | 0 | 3 | 2 |
| Viscosity, cs.: | | | | | |
| 210° F | 5.67 | 5.43 | 5.37 | 5.32 | 5.30 |
| 100° F | 31.57 | 29.56 | 29.58 | 28.92 | 28.89 |
| −40° F | 8,177 | 7,176 | 6,968 | 7,164 | 7,084 |
| Viscosity index | 132 | 132 | 129 | 130 | 128 |
| Pour point, °F | −70 | −75 | −80 | −75 | −75 |

EXAMPLE 3

This example illustrates the type of product obtained when using 100% olefin conversion and higher. The process conditions were similar to Example 1 except the reaction was allowed to proceed to a higher conversion of the olefin.

The process conditions for a series of runs are shown in Table IV while the properties of the products for these runs are shown in Table V.

TABLE IV

| | | | | | Reaction conditions | | | | |
|---|---|---|---|---|---|---|---|---|---|
| | | | | | | Mole ratio | | Olefin conversion, percent | Bottoms (as percent of olefin charge) |
| | Olefin | Promoter | T, °C. | Time, hrs. | Olefin/Bz | AlCl$_3$/olefin | AlCl$_3$/Nm | | |
| Run number: | | | | | | | | | |
| P | C$_{10}$ | None | 50 | 6.0 | 0.20 | 0.078 | 0.180 | 100+ | 48.8 |
| Q | C$_{10}$ | 1.1% RCl | 63 | 4.0 | 0.20 | 0.039 | 0.090 | [1] (131) | 50.0 |
| R | C$_{10}$ | 1.1% RCl | 60 | 7.5 | 0.20 | 0.039 | 0.090 | [1] (163) | 41.8 |

[1] Olefin conversion above 100% is a calculated value based on extrapolation of the rate of olefin monomer disappearance to greater than 100% olefin monomer consumption.

TABLE V

| Run No. | Olefin conversion, percent | Average molecular weight | Mass spectrometer analysis, percent | | | Viscosity, cs. [1] | | | Visc. index | Pour point, °F. |
|---|---|---|---|---|---|---|---|---|---|---|
| | | | Alkyl-benzene | Oli-gomer | Dimer | 210° F. | 100° F. | —40° F. | | |
| P | 100+ | 531 | 98 | 2 | 0 | 7.79 | 54.02 | 34,764 | 120 | —65 |
| Q | (131) | 505 | 100 | 0 | 0 | 6.98 | 47.40 | 27,222 | 114 | —65 |
| R | (163) | 519 | 100 | 0 | 0 | 7.57 | 52.25 | 33,965 | 119 | —60 |

EXAMPLE 4

This example illustrates having a mono-long-chain-alkyl compound in the initial admixture.

The procedure was as follows. To a creased flask equipped with a stirrer and a thermometer were added 888 g. (11.3 m.) of benzene, 322 g. (2.3 m.) of decene-1 and 189 g. (0.77 m.) of n-dodecylbenzene. The solution was heated to 50 C. before the addition of 12.0 g. (0.09 m.) of aluminum chloride dissolved in 60.0 g. (1.0 m.) of nitromethane. Water (250 µl.) was added as a promoter to the stirred, straw yellow solution. Reaction was allowed to continue at 50° C. for 8.0 hours before quenching. The product was washed with water (2 times), 5% sodium carbonate and water (3 times) before drying over sodium sulfate. Distillation afforded 30.2 g. of recovered decene, 244.0 g. of decyl- and dodecyl-benzene and 175.2 g. of product isolated as a distillation residue. The product was composed of 54.6% decene oligomers, 18.1% didecylbenzenes, 24.4% decyldodecylbenzenes, 1.4% tridecylbenzenes and 1.5% didecyldodecylbenzenes.

The product had the following physical properties:

Viscosity, cs.:
   100° F. _____ 12.68
   210° F. _____ 3.05
   —40° F. _____ 1,493
Viscosity index _____ 108
Pour point, ° F. _____ —75+

EXAMPLE 5

This example illustrates having in the initial admixture a minor amount of a synthetic hydrocarbon containing a major amount of monoalkaryls. The particular synthetic hydrocarbon had the following composition:

|  | Vol. percent [1] |
|---|---|
| N-Alkylbenzenes [2] | 69.3 |
| Alkyl-substituted tetrahydronaphthalenes [3] | 22.3 |

[1] Substantially the same as weight percent.
[2] Predominantly $C_{13}$–$C_{14}$ alkyl groups.
[3] Substantially the same molecular weight as the n-alkylbenzenes.

The procedure was as follows. To a creased flask equipped with a thermometer and a stirrer were added 503 g. (2.05 m.) of synthetic hydrocarbon described above, 647 g. (3.8 m.) of dodecene-1 and 16.7 g. (0.08 m.) of dodecyl chloride. This solution was warmed to 70° C. and a solution of 20.0 g. (0.15 m.) of aluminum chloride in 200 g. (3.3 m.) of nitromethane was added as catalyst. A mild exothermic reaction took place in the yellow heterogeneous mixture during 3 hours of stirring. The product was transferred to a separatory funnel, 111.7 g. of catalyst solution was split out, and the remainder was quenched, washed with water (2 times), 5% sodium carbonate and water (3 times) and dried over sodium sulfate. Distillation gave 254.4 g. of recovered dodecene, 372.7 g. of recovered monoalkylates, 168.4 g. of dodecene dimer and 283.4 g. of bottoms product. Major compound types in the product were alkyl-substituted tetrahydronaphthalenes (22.8%), alkylbenzenes (46.8%) and dodecene oligomers (19.0%).

The product had the following physical properties:

Viscosity, cs.:
   100° F. _____ 34.75
   210° F. _____ 5.65
   —40° F. _____ 13,443
Viscosity index _____ 112
Pour point, ° F. _____ —70

Thus, having described the invention in detail, it will be understood by those skilled in the art that certain variations and modifications may be made without departing from the spirit and scope of the invention as defined herein and in the appended claims.

I claim:

1. A process for preparing a synthetic hydrocarbon lubricant, said lubricant comprising a mixture of long-chain, substantially linear, alkyl-substituted aryl hydrocarbons, containing a total of 12 to 42 carbon atoms in the long-chain alkyl group or groups, and linear mono-olefin oligomers, said process comprising:
   (a) forming an admixture of
      (i) about 0.1 to about 10 moles of $C_6$–$C_{16}$ α-olefins,
      (ii) about 1 mole of (A) mononuclear aromatic hydrocarbons containing 6 to 10 carbon atoms or (B) a mixture of a major amount of mononuclear aromatic hydrocarbons containing 6 to 10 carbon atoms and a minor amount of mononuclear aromatic hydrocarbons containing 6 to 10 carbon atoms which have a $C_6$–$C_{16}$ straight chain alkyl group attached thereto,
      (iii) about 0.1 to about 10 weight percent of nitromethane modified aluminum chloride or aluminum bromide containing from about 1 to about 25 moles of nitromethane per mole of aluminum chloride or aluminum bromide,
   (b) under reaction-promoting conditions of time in the range of about ¼ to 12 hours, and a temperature in the range of about 30 to about 80° C. reacting the admixture of step (a) until from about 15 to about 90 weight percent of the linear mono-olefins have been converted to products of higher molecular weight, and
   (c) recovering from the reaction product of step (b) the desired mixture of long-chain, substantially linear, alkyl-substituted aryl hydrocarbons and linear olefin oligomers.

2. The process of claim 1 wherein the reaction temperature is in the range of about 50 to about 70° C. and the degree of α-olefin conversion is about 40 to about 90 percent.

3. The process of claim 2 wherein the α-olefin contains 8 to 12 carbon atoms and the mononuclear aromatic hydrocarbon is benzene.

4. The process of claim 3 wherein the α-olefin is a mixture wherein the average number of carbon atoms is about 10.

5. The process of claim 3 wherein the α-olefin is decene-1.

6. The process of claim 4 wherein the resulting product contains about 20 to about 50 weight percent long-chain alkylbenzenes, about 50 to about 80 weight percent olefin oligomers and less than 10 weight percent olefin dimers.

7. A process for preparing a synthetic hydrocarbon lubricant, said lubricant comprising a mixture of long-chain, substantially linear, alkyl-substituted aryl hydrocarbons, containing a total of 12 to 42 carbon atoms in the long-chain alkyl group or groups, and linear mono-olefin oligomers, said process comprising:
   (a) forming an admixture of
      (i) about 0.1 to about 10 moles of $C_6$–$C_{16}$ α-olefins, (ii) about 1 mole mononuclear aromatic hydrocarbon containing 6 to 10 carbon atoms, and (iii) about 0.1 to about 10 weight percent, based on said α-olefin, of nitromethane modified aluminum chloride or aluminum bromide containing from about 1 to about 25 moles of nitromethane per mole of aluminum chloride or aluminum bromide, (b) under reaction-promoting conditions of time in the range of about ¼ to about 12 hours and a temperature in the range of about 30 to about 80° C. reacting the admixture of step (a) until from about 15 to about 90 weight percent of the linear mono-olefins are converted to products of higher molecular weight, and (c) recovering from the reaction product of step (b) the desired mixture of long-chain, substantially linear, alkyl-substituted aryl hydrocarbons and linear olefin oligomers.

8. The process of claim 1 wherein the reaction temperature is in the range of about 40 to about 70° C. and the degree of α-olefin conversion is about 40 to about 90 percent.

9. The process of claim 8 wherein the mononuclear aromatic hydrocarbon is benzene.

10. The process of claim 9 wherein the amount of α-olefin is about 0.2 to about 0.5 mole.

11. The process of claim 10 wherein the catalyst is nitromethane modified aluminum chloride.

12. The process of claim 11 wherein the amount of catalyst is about 1 to about 5 weight percent.

13. The process of claim 12 wherein the α-olefin contains 8 to 14 carbon atoms.

14. The process of claim 13 wherein the α-olefin is a mixture wherein the average number of carbon atoms is about 10.

15. The process of claim 13 wherein the α-olefin is decene-1.

16. The process of claim 14 wherein the resulting product contains about 20 to about 50 weight percent long-chain alkylbenzenes about 50 to about 80 weight percent olefin oligomers and less than 10 weight percent olefin dimers.

17. The process of claim 16 wherein the product has the following properties:

Pour point, ° F., at least as low as _____ −70
Viscosity index, min. _____ 120
Viscosity, cs.:
    −40° F., max. _____ 8,000
    210° F., min. _____ 5.0

18. The process of claim 15 wherein the resulting product contains about 20 to about 50 weight percent long-chain alkylbenzenes, about 50 to about 80 weight percent olefin oligomers and less than 10 weight percent olefin dimers.

19. The process of claim 18 wherein the product has the following properties:

Pour point, ° F., at least as low as _____ −70
Viscosity index, min. _____ 120
Viscosity, cs.:
    −40° F., max. _____ 8,000
    210° F., min. _____ 5.0

20. The process of claim 19 wherein the reaction temperature is about 50 to about 60° C.

References Cited

UNITED STATES PATENTS

| | | | |
|---|---|---|---|
| 2,992,282 | 7/1961 | Schmerling et al. | 260—671 B |
| 3,288,716 | 11/1966 | Becraft et al. | 252—59 |
| 3,173,965 | 3/1965 | Pappas et al. | 252—59 X |
| 2,518,529 | 8/1950 | Casson et al. | 252—59 X |

W. H. CANNON, Primary Examiner

U.S. Cl. X.R.

260—671 B